United States Patent [19]

Nishimura

[11] Patent Number: 5,671,427

[45] Date of Patent: Sep. 23, 1997

[54] DOCUMENT EDITING APPARATUS USING A TABLE TO LINK DOCUMENT PORTIONS

[75] Inventor: Kazuhiko Nishimura, Yokohama, Japan

[73] Assignee: Kabushiki Kaisha Toshiba, Kawasaki, Japan

[21] Appl. No.: 539,835

[22] Filed: Oct. 6, 1995

[30] Foreign Application Priority Data

Oct. 12, 1994 [JP] Japan ................................. 6-246083

[51] Int. Cl.$^6$ ........................................... G06F 15/00
[52] U.S. Cl. ......................... 395/770; 395/776; 395/784; 395/802
[58] Field of Search ................................. 395/770, 774, 395/776, 784, 792, 793, 802

[56] References Cited

U.S. PATENT DOCUMENTS

| 4,876,665 | 10/1989 | Iwai et al. | 395/616 |
|---|---|---|---|
| 4,996,665 | 2/1991 | Nomura | 395/616 |
| 5,033,008 | 7/1991 | Barker et al. | 395/785 |
| 5,119,491 | 6/1992 | Iwai et al. | 395/774 |
| 5,129,052 | 7/1992 | Barker et al. | 395/776 |
| 5,130,924 | 7/1992 | Barker et al. | 395/770 |
| 5,179,650 | 1/1993 | Fukui et al. | 395/782 |
| 5,257,186 | 10/1993 | Ukita et al. | 395/793 |
| 5,434,962 | 7/1995 | Kyojima et al. | 395/774 |
| 5,499,369 | 3/1996 | Atkinson | 395/680 |
| 5,557,722 | 9/1996 | DeRose et al. | 395/774 |
| 5,557,787 | 9/1996 | Shin et al. | 395/613 |
| 5,598,518 | 1/1997 | Saito | 395/793 |

FOREIGN PATENT DOCUMENTS 3-252759  11/1991  Japan.

*Primary Examiner*—Mark K. Zimmerman
*Assistant Examiner*—Joseph R. Burwell
*Attorney, Agent, or Firm*—Oblon, Spivak, McClelland, Maier & Neustadt, P.C.

[57] ABSTRACT

A document editing apparatus is provided, which can perform a linking process after checking the entire correspondence between sentences in an existing document which are to be copied and portions in a currently edited document in which the sentences are to be inserted, thereby preventing editing errors and improving the editing efficiency. The apparatus includes a source document segmenting device for segmenting the source document in accordance with its structure, an editing document segmenting device for segmenting the editing document in accordance with its structure, a table display device for displaying a link relation control table indicating the structural correspondence between the two documents by using the start character strings of the segmented portions, a linking designation device for executing designation of linking on the displayed table, a linking designation display device for marking a combination for which linking designation is performed on the table to discriminate the combination, and a document linking processor for performing a linking process for the marked combination to link the designated sentence in the source document with the designated portion in the editing document.

15 Claims, 13 Drawing Sheets

| FILE     EDIT |

Background of the Invention ~11

1. Field of the Invention ~12

This invention relates to a document editing apparatus which can ...

2. Description of the Related Art ~12

A conventional document editing apparatus includes following problems; ...

Summary of the Invention ~11

It is an object of the invention to provide an improved document editing apparatus.

According to the present invention, ...

Brief Description of the Drawings ~11

FIG. 1 is a block diagram of the first embodiment of the document editing apparatus;

FIG. 2 ...

Detailed Description of the Preferred Embodiments ~11

A preferred embodiment of the this invention will now be described. ...

FIG. 2

```
LIST OF HEADINGS

1.  Introduction 1.1  Background 1.2  Purpose

2.  Discussion of Problem

3.  Solution

4.  Conclusion
```

FIG. 3A

```
TEXT

1.  Introduction 1.1  Background

This system has been developed by using a **
algorithm solving a ** problem in a field of **.
This system has following features.

This project is started at 1990 by members of
** sections based on a report of working group **.

1.2  Purpose

Recently, computers are down-sizing and
architecture is opened to public.
```

FIG. 3B

```
FILE       EDIT
```

Background of the Invention

1. Field of the Invention

This invention relates to a document editing apparatus which can ...

2. Description of the Related Art

Recently, computers are down-sizing and architecture is opened to public. A conventional document editing apparatus includes following problems; ...

Summary of the Invention

It is an object of the invention to provide an improved document editing apparatus.

This system has been developed by using a  algorithm solving a  problem in a field of **. This system has following features. ...

Detailed Description of the Preferred Embodiments

Figure 1:
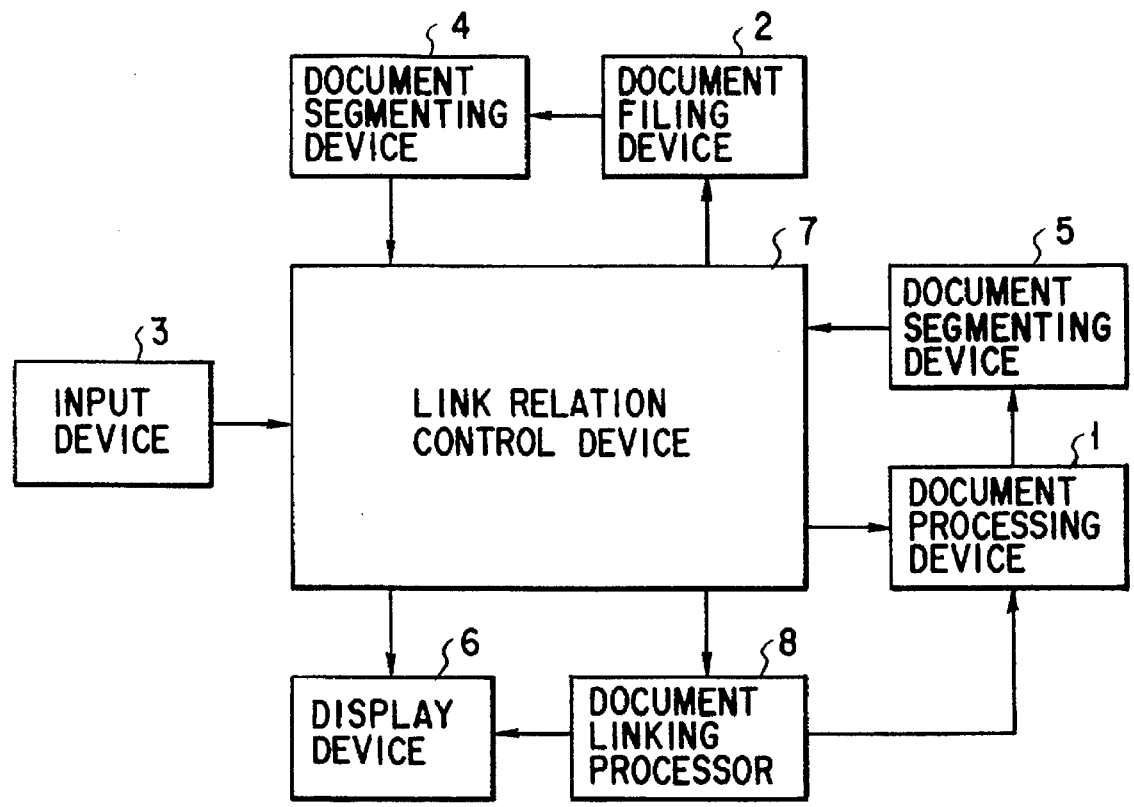
FIG. 1 is a block diagram of the first embodiment of the document editing apparatus; ...

A preferred embodiment of the this invention will now be described. This project is started at 1990 by members of  sections based on a report of working group . ...

FIG. 9

FIG. 12

FROM: 1.1 Background     TO: Summary of the     OK

| FROM \ TO | 1. Introduction | 1.1 Background | This system has been developed... | This system has following features. | This project is started at 1990... |
|---|---|---|---|---|---|
| 1. Field of the Invention | X | X | X | X | X |
| 2. Description of the Related | X | X | ✓ | | |
| Summary of the Invention | X | X | ↙ | 2 | 1 |
| Brief Description of Drawings | X | X | | | |
| Detailed Description | X | X | ✓ | | |

(Note: values "3" and "2" appear in the "1. Field of the Invention" column rows for "This system has been developed..." = 3 and "This system has following features." = 2)

DOCUMENT EDITING APPARATUS USING A TABLE TO LINK DOCUMENT PORTIONS

BACKGROUND OF THE INVENTION

1. Field of the Invention

The present invention relates to a document editing apparatus which facilitates the creation of a document by copying or linking (both "copying" and "linking" will be simply referred as "linking" hereinafter) part or all of one or a plurality of documents in or with a given document.

2. Description of the Related Art

As known well, when a document processing apparatus such as a word processor or a personal computer is used to create/edit a document, a new document is often created by reusing an existing document. For example, part of an existing document is inserted in a document under an editing process, a plurality of portions of the existing document are merged therewith, or most of the existing document is reused. In this case, linking is mostly performed in units of elements such as chapters or sections or in units of paragraphs. The range of a source element in an existing document is designated first, and a position to be linked in an editing document under an editing process is then designated. This operation is repeated by the number of times of linking. In this manner, a linking process is performed.

In this editing method, however, a plural number of an existing document cannot be simultaneously inserted in different portions of a document under an editing process. For this reason, in performing edit processing by merging an existing document with an editing document under an editing process or rearranging an existing document, it is difficult to imagine the overall structure of a document after edit processing. This tends to cause an editing error.

Furthermore, in the conventional editing method, linking is performed one by one by designating a source document and an editing document. Therefore, once linking is performed, the relationship between the source document and the editing document tends to be unclear. For this reason, the linked portion cannot be easily canceled, and the editing efficiency is poor.

As described above, in the conventional editing method, after a source document is designated, an editing document is designated, and linking is executed. Since this operation must be repeatedly performed, an editing error tends to occur, and edit processing cannot be efficiently performed.

SUMMARY OF THE INVENTION

Accordingly, it is an object of the present invention to provide a document editing apparatus which can perform a linking process for linking a document, one of a plurality of documents, or a plurality of portions with a given document, after checking the correspondence between a portion of a source document which is to be linked and a portion of an editing document with which the portion of the source document is to be linked, thereby preventing editing errors and improving the efficiency of editing process.

According to the present invention, there is provided a document editing apparatus for linking a portion of a source document with an editing document, the apparatus comprising source document segmenting means for segmenting the source document into portions in accordance with a document structure; editing document segmenting means for segmenting the editing document into portions in accordance with a document structure; table display means for creating and displaying a table indicating a logical structure of the source document which is formed of the portions of the source document obtained by the source document segmenting means and a logical structure of the editing document which is formed of the portions of the editing document obtained by the editing document segmenting means; linking designation means for designating linking portions by using the table displayed by the display means, designated linking portions being marked on the table; and linking process means for performing a linking process for the designated linking portions to simultaneously link designated portions in the source document with designated portions in the editing document.

Note that one document segmenting means may be used as both the source document segmenting means and the editing document segmenting means.

The table is created by arranging the headings of the portions of the source document in one of the column and the row and the headings of the portions of the editing document in the other of the column and the row and the linking designation means preferably designates linking portions by using an intersecting position between the row and the column on the table displayed on the display means.

In addition, the table displaying means preferably includes means for displaying a combination of portions which cannot be linked with each other on the link relation control table to inform that a linking process cannot be performed.

According to the present invention, when an existing document is to be linked with another document, portions of the existing document can be properly linked in units of elements, e.g., chapters or sections, or in units of paragraphs or sentences, in accordance with an instruction from the user. When a specific portion is to be inserted in different portions or a plural number of portions are to be unified into a portion belonging to one element, since the link relation can be known before a linking process, linking errors can be reduced, and the document editing efficiency can be improved.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

Figure 4A:
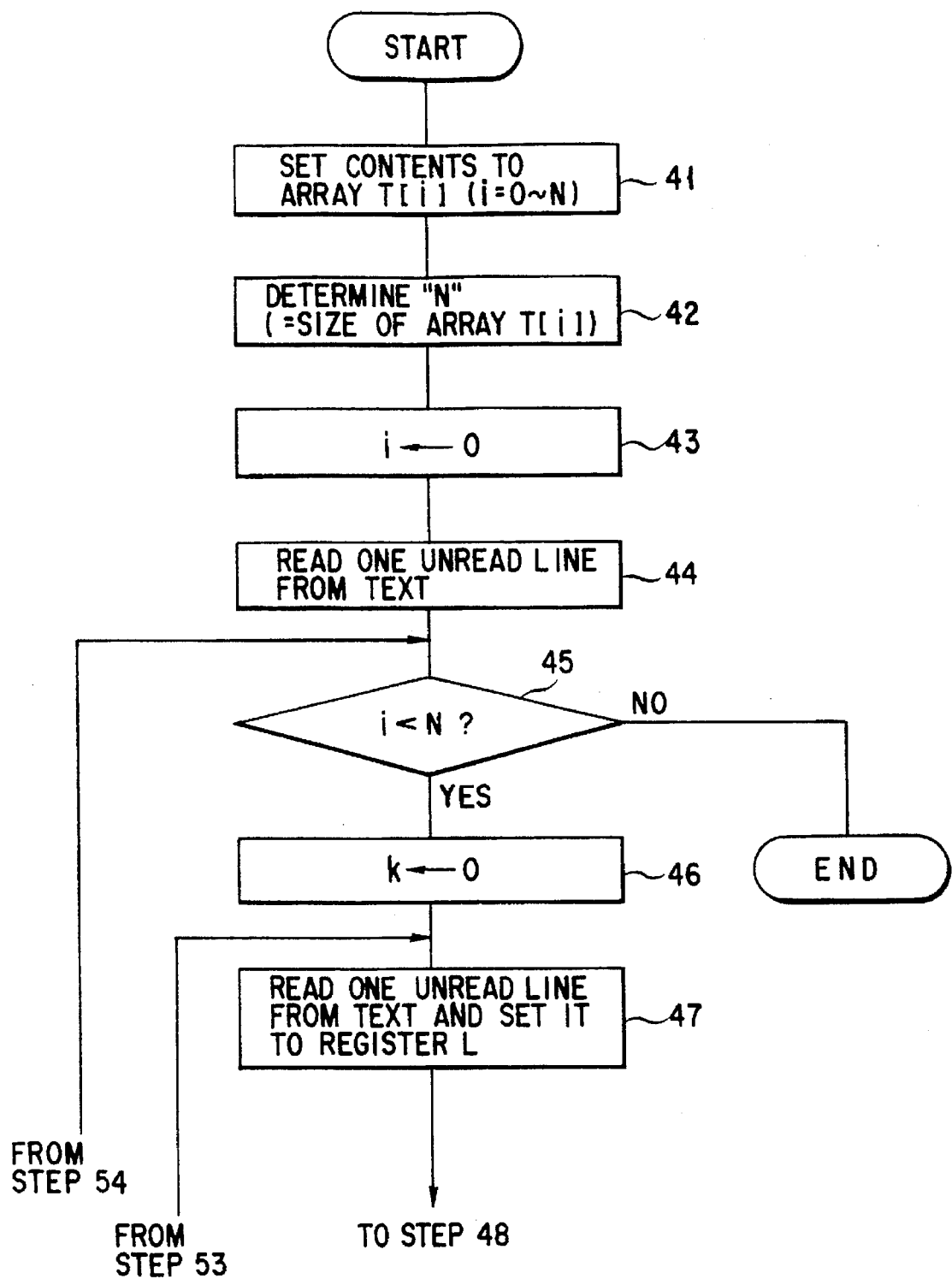
Figure 4B:
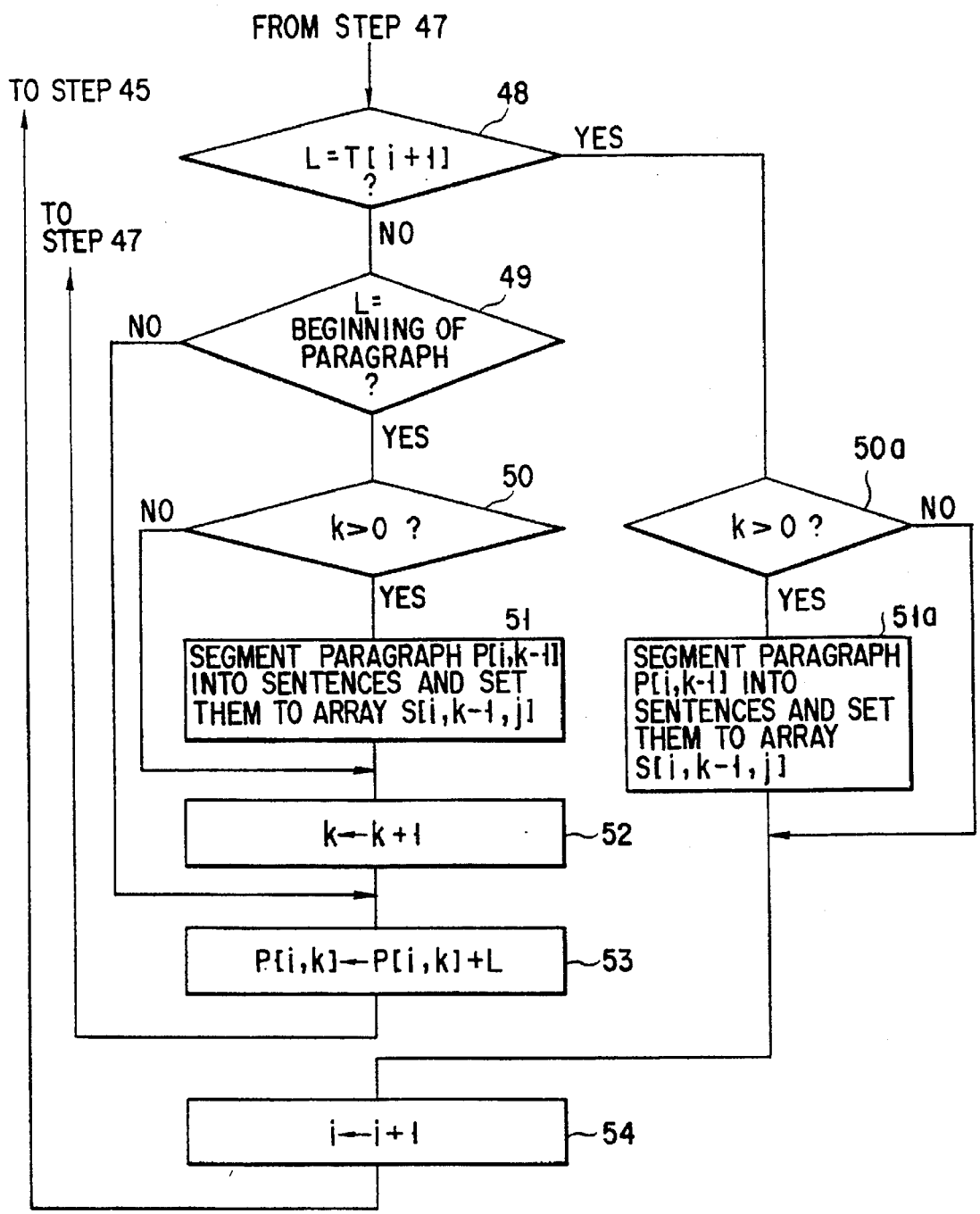
Figure 5:
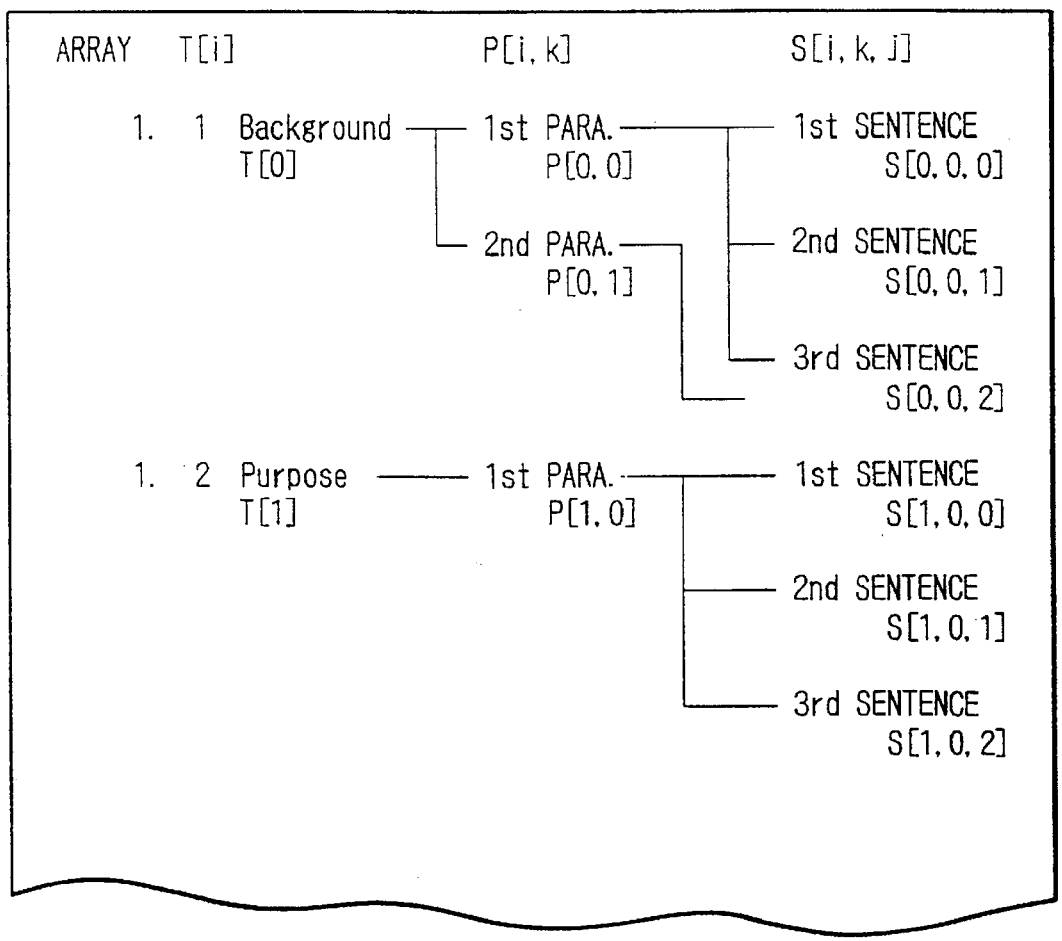
Figure 6:
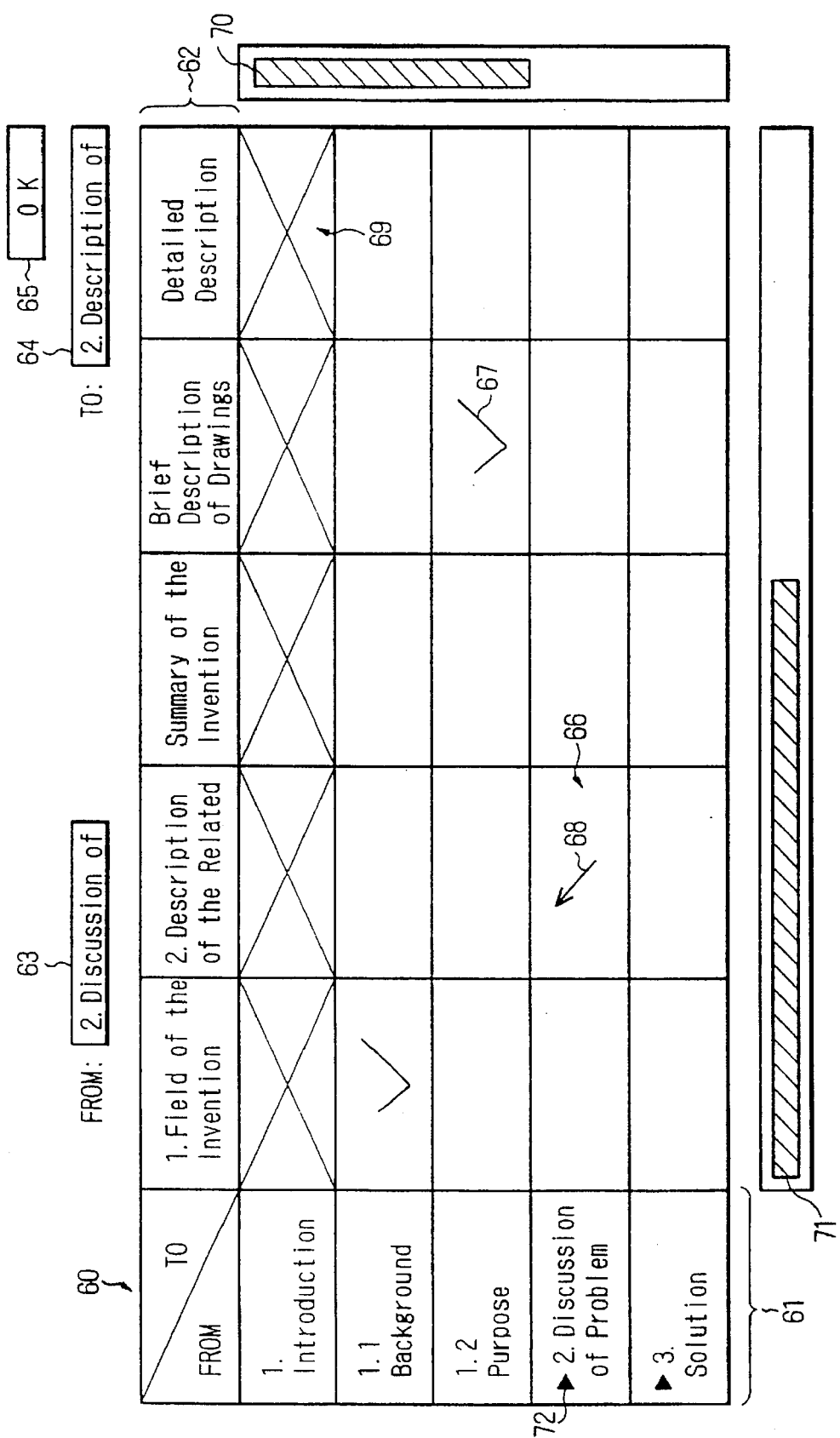
Figure 7:
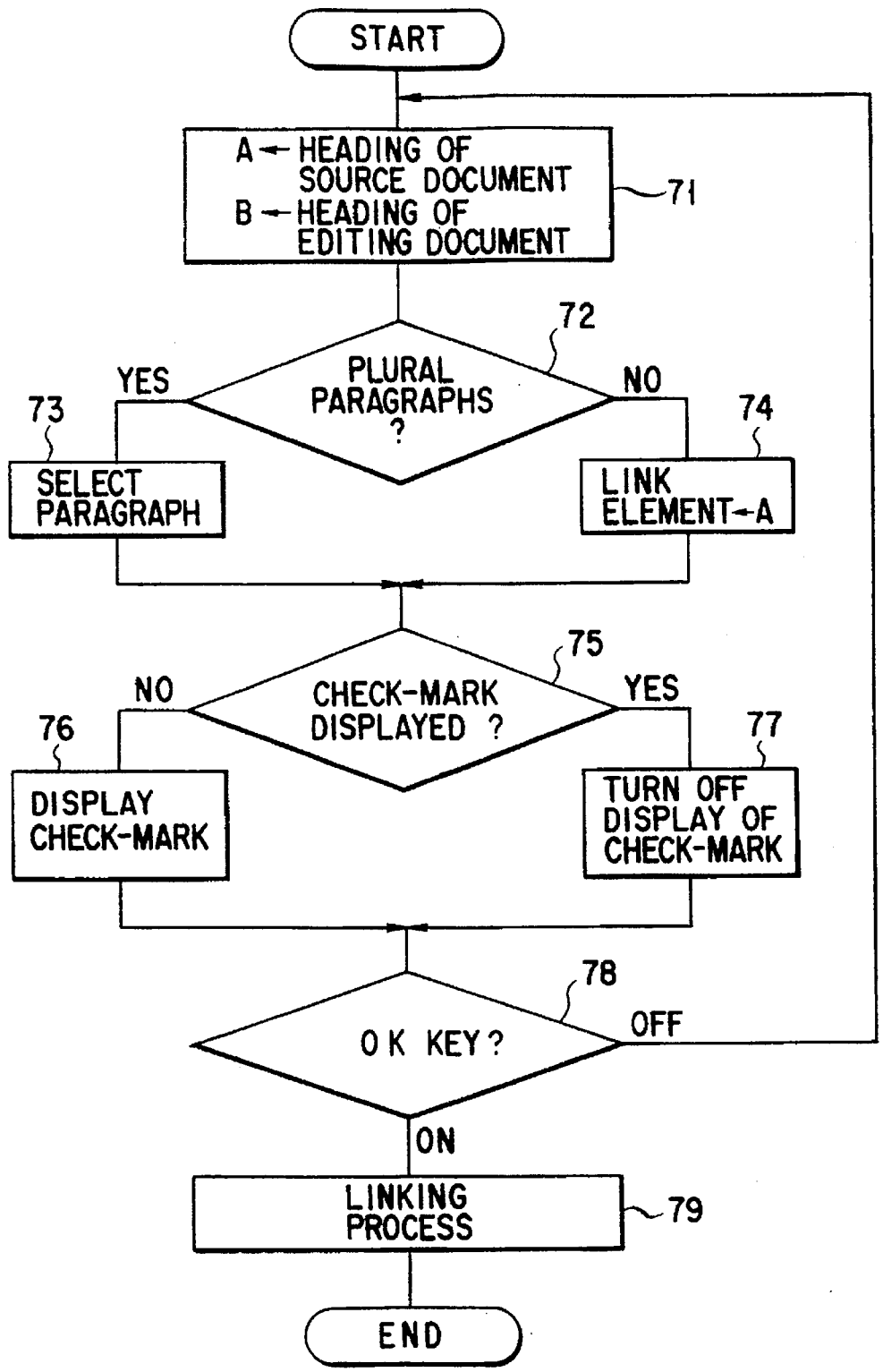
Figure 8:
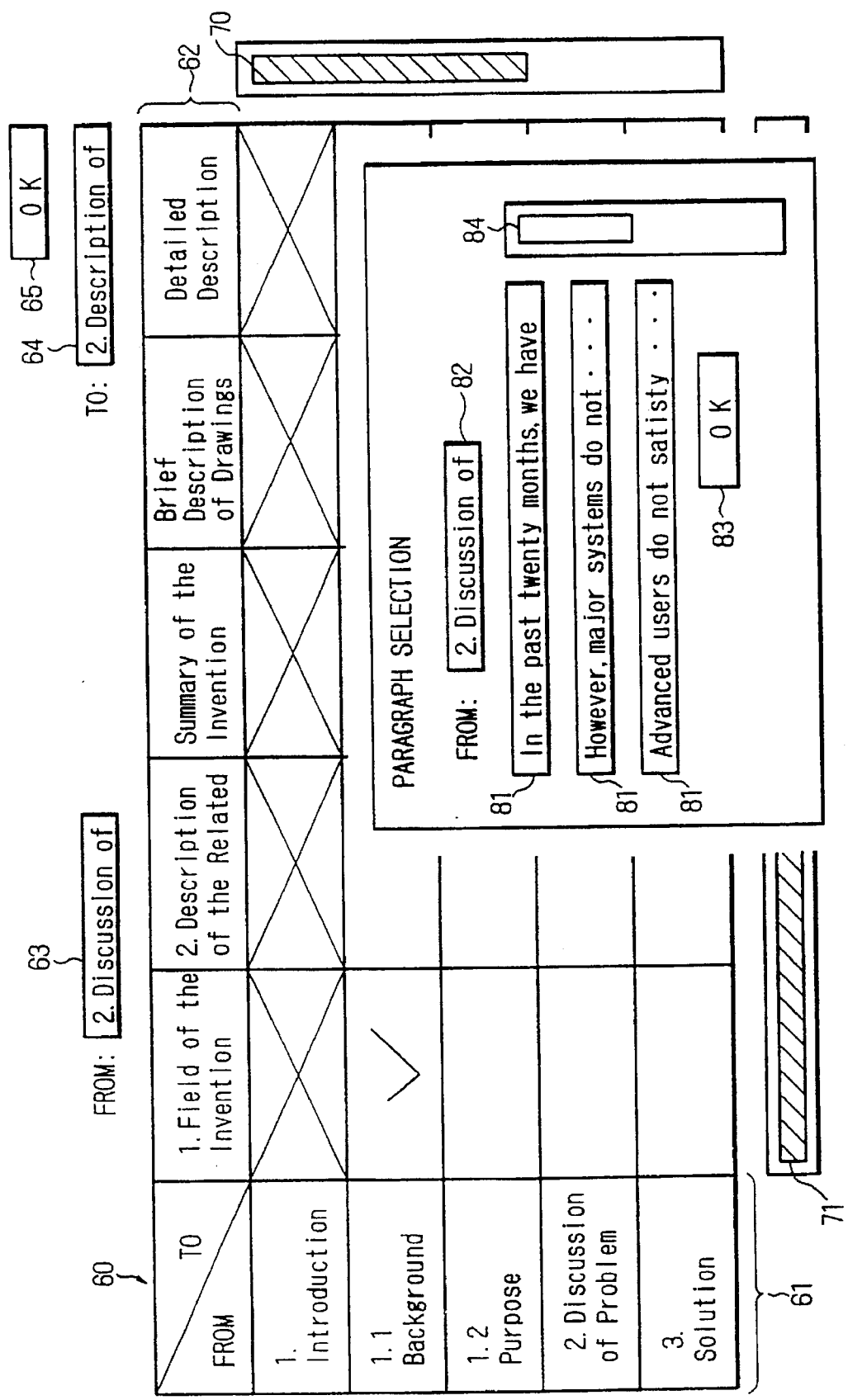
Figure 10:
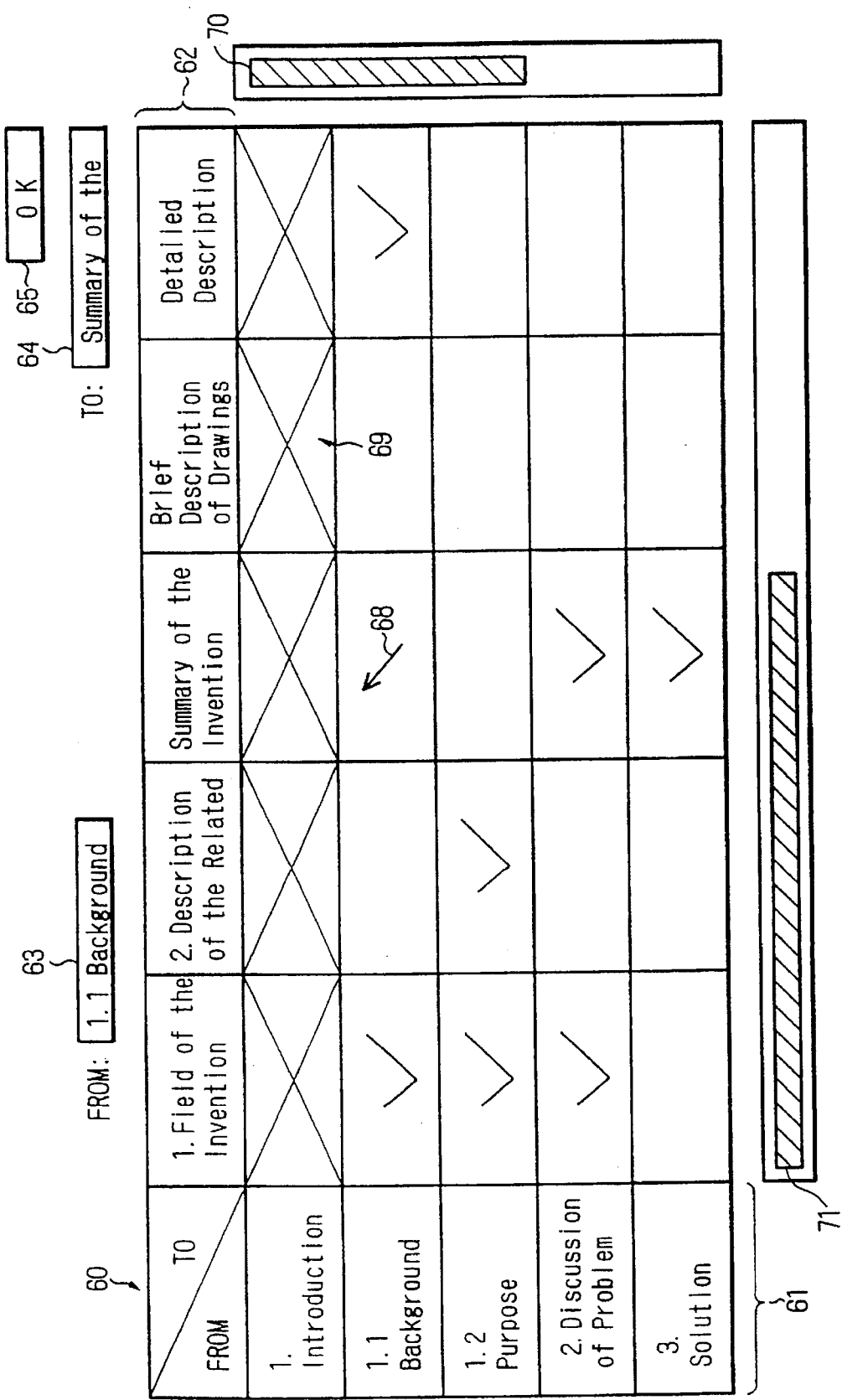
Figure 11:
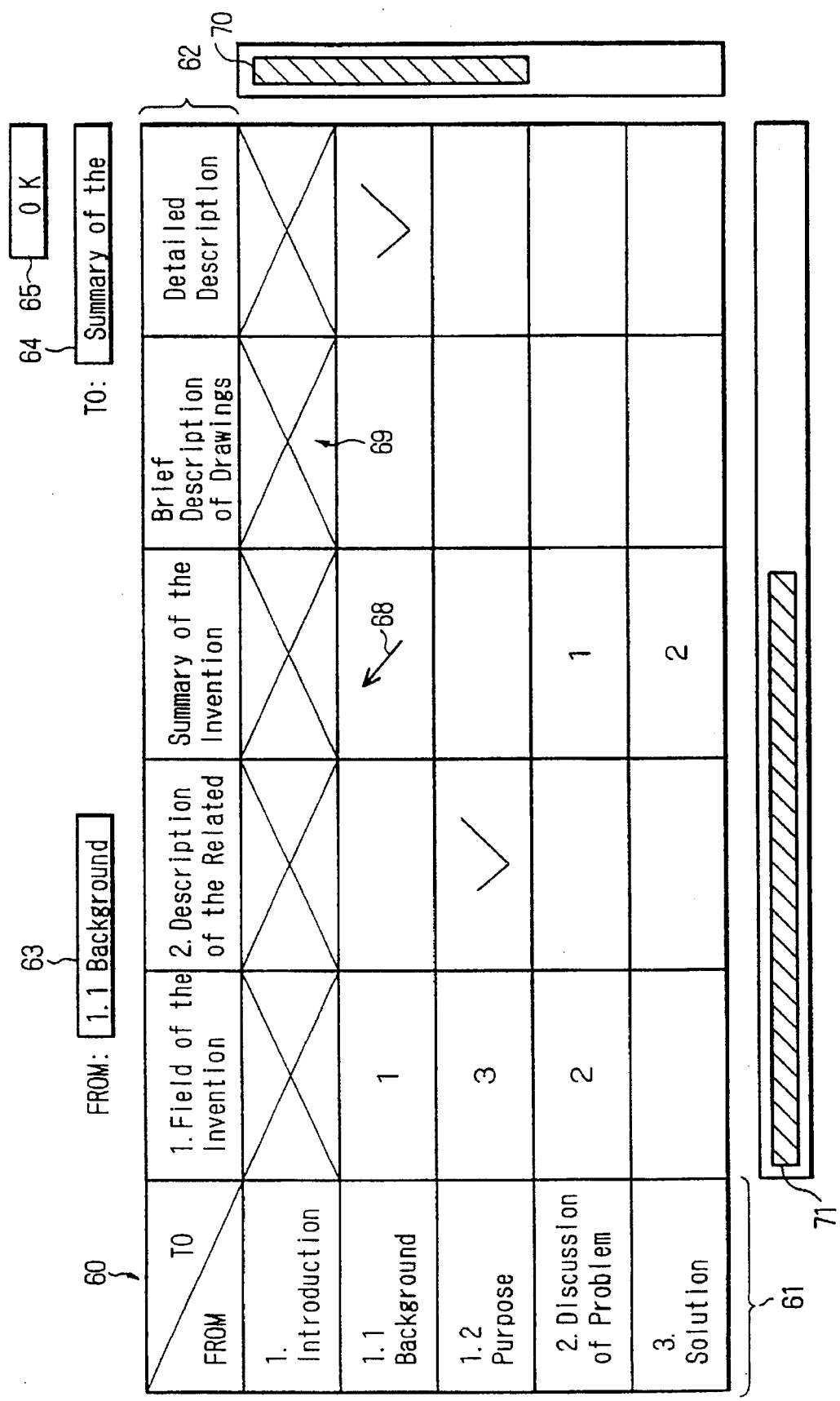

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG.1 is a block diagram showing a document editing apparatus according to the first embodiment of the present invention;

FIG. 2 is a view showing a patent specification as an editing document which is currently processed by a document processing apparatus;

FIG. 3A is a view showing the list of headings of a research and development report as a source document read out from a document filing device;

FIG. 3B is a view showing the text of the research and development report as the source document read out from the document filing device;

FIG. 4A and 4B are flow charts showing a sequence of operations in a source document segmenting device;

FIG. 5 is a view showing the logical structure of a source document which is obtained by segmenting the document contents in a document segmenting device;

FIG. 6 is a table showing the correspondence between the logical structures of a source document and an editing document displayed on a display device;

FIG. 7 is a flow chart showing a sequence of operations in a link relation control device;

FIG. 8 is a view showing a selection screen displayed on the display device;

FIG. 9 is a view showing an editing document after a linking process;

FIG. 10 is another table showing the correspondence between the logical structures of a source document and an editing document displayed on a display device;

FIG. 11 is a still another table showing the correspondence between the logical structures of a source document and an editing document displayed on a display device; and FIG. 12 is a still further table showing the correspondence between the logical structures of a source document and an editing document displayed on a display device.

DETAILED DESCRIPTION OF THE PREFERRED EMBODIMENTS

A preferred embodiment of a document editing apparatus according to the present invention will now be described with reference to the accompanying drawings.

FIG. 1 is a block diagram showing the arrangement of a document editing apparatus according to an embodiment of the present invention. This document editing apparatus is roughly comprised of a document processing device 1, a document filing device 2, an input device 3, document segmenting devices 4 and 5, a display device 6, a link relation control device 7, and a document linking processor 8.

The document processing device 1 is comprised of a word processor or a personal computer for processing a document (editing document) under an editing process. The document filing device 2 is used to store an existing document (source document). The input device 3 is comprised of a keyboard, a mouse, a light-pen, or the like. The document segmenting device 4 reads out a predetermined source document from the document filing device 2 in accordance with a command from the input device 3 in linking a source document with an editing document, and segments the document into a plural number of portions in accordance with the list of headings of the document. Similarly, the document segmenting device 5 reads out an editing document which is currently processed by the document processing device 1 in accordance with a command from the input device 3 in linking the source document with the editing document, and segments the document into a plural number of portions in accordance with its list of headings. The link relation control device 7 shows a list of the logical structures of the two documents by using the start character strings of the respective portions obtained by the segmentation in the document segmenting devices 4 and 5, creates a link relation control table showing the correspondence between the two documents, and displays it on the display device 6. In addition, the link relation control device 7 designates linking process on the link relation control table in accordance with a command from the input device 3, and makes a mark on the link relation control table to make the link command recognizable. The document linking processor 8 links a designated sentence, in the source document, which corresponds to the marked position with a designated portion of the editing document in accordance with a command from the input device 3. Note that the respective devices need not be independent hardware units, but may be combined with each other, as needed, by means of software.

Assume that a portion of an existing document stored in the document filing device 2 is to be linked with a document which is currently processed by the document processing device 1 by using the document editing apparatus having the above arrangement. A procedure for this operation and the operation of each device will be described next. Assume that a patent specification is created by the document processing device 1, and a portion of a research and development report read out from the document filing device 2 is linked with this specification to create a better specification.

As known well, the elements of a patent specification and the arrangement thereof are defined by the patent law. As shown in FIG. 2, pieces of title information 11 such as "Background of the Invention", "Summary of the Invention", "Brief Description of the Drawings", and "Detailed Description of the Preferred Embodiments" are put before the respective elements in principle. Note that two subtitles 12, i.e., "1. Field of Invention" and "2. Description of the Related Art" follow "Background of the Invention". That is, the titles constitute two layers. However, a text does not follow the "Background of the Invention". Therefore, for the sake of simplicity, the title "Background of the Invention" is ignored and the sub-titles "1. Field of Invention" and "2. Description of the Related Art" are regarded as the titles 11.

In general, a research and development report is divided into list of headings information 31 like the one shown in FIG. 3A and text information 32 like the one shown in FIG. 3B. Assume that the patent specification in FIG. 2 is created by the document processing device 1, and the portion of a research and development report which is shown in FIGS. 3A and 3B is linked with the specification.

First of all, the input device 3 is operated to read the target source document from existing documents which are stored in the document filing device 2. The read document is input to the document segmenting device 4.

The document segmenting device 4 segments the readout document, i.e., the source document, as follows. As described above, the source document is comprised of the list of headings information 31 and the text information 32. The list of headings information 31 is an array of headings of the constituent units of the document. A heading is a character string (title word) such as a chapter or section name or a combination of the a numerical number and the name. When a heading is indented with blanks being inserted before the heading, the heading is regarded as a child heading of the immediately preceding heading. For example, "1.1 Background" and "1.2 Purpose" are the child headings of "1. Introduction".

The text information 32 consists of a character string indicating the headings defined by the list of headings information 31 plus the contents of the text relating to the respective headings. That is, the text information 32 has the following form:

heading text . . .

text . . .

heading text . . .
text . . .

In this case, each heading is a character string which satisfies the following conditions: 1) being equivalent to a character string defined by the list of headings information 31; and 2) being one line (less than two lines).

Each text relating to the heading is a character string which satisfies the following conditions: 1) starting from a line next to the current heading and ending at a line before the next heading; 2) consisting of a plural number of paragraphs which are determined by a method to be described later; 3) determining one or more blank lines as text; 4) regarding a line consisting of only spaces or tabs as a blank line; and 5) regarding consecutive blank lines as one line.

If the source document is not divided into the list of headings information 31 and the text information 32, the list of headings information 31 and the text information 32 are extracted from the document information in accordance with the above definitions.

FIGS. 4A and 4B show a procedure for the segmentation of the source document in the document segmenting device 4.

At step 41, the character strings of the respective pieces of the list of headings information 31 of the document (shown in FIG. 3A) read out from the document filing device 2 are set to an array T[i] (i=0 to N).

At step 42, a number N of elements of the array T[i] is obtained.

At step 43, "0" is set as an initial value to a variable "i" indicating an element of the array.

At step 44, the start line of the text information 32 of the source document (shown in FIG. 3B) read out from the document filing device 2, i.e., "1. INTRODUCTION", is read. In the text information 32, a line feed code is attached to the end of each line. At step 44, the text is read until a line feed code is detected.

At step 45, it is determined whether the variable "i" is smaller than N. If NO at step 45, the processing is ended.

If YES at step 45, "0" is set as an initial value to a variable "k" indicating a paragraph at step 46.

At step 47, the first line ("1.1 BACKGROUND" in the first execution of step 47) of the unread portion of the text information 32 (shown in FIG. 3B) read out from the document filing device 2 is read, and the read contents is stored in a register L.

At step 48, the contents of the register L is compared with the character string ("1.1 BACKGROUND"0 in the first execution of step 48) set to T[i+1]. If they do not coincide with each other, it is determined at step 50a whether the variable "k" is larger than "0". If NO at step 50a, the flow jumps to step 54. If YES at step 50a, a paragraph P[i, k] is segmented into sentences, and the sentences are set to array S[i, k−1, j] (j=0, . . . ) at step 51a. At step 54, the variable "i" is incremented by one, and the flow returns to step 45.

If they coincide with each other, it is determined at step 49 whether the contents of the register L are the beginning of a paragraph. If YES at step 49, it is determined at step 50 whether the variable "k" is larger than "0". If NO at step 50, the flow jumps to step 52. If YES at step 50, a paragraph P[i, k] is segmented into sentences, and the sentences are set to array S[i, k−1, j] (j=0, . . . ) at step 51. At step 52, the variable "k" is incremented by one. At step 53, the contents of the register L is added to the contents of the array P[i, k] to update the array P[i, k]. If NO at step 49, step 53 is immediately executed. After step 53, the flow returns to step 47.

With the above processing, the text information 32 is segmented into element units, i.e., paragraphs or sentences, and the respective elements are set to the arrays P[i, k] (i=0 to N; k=0, . . . ) and the arrays S[i, k, j] (j=0, . . . ), as shown in FIG. 5. In this case, "to set" means to store data in a corresponding memory (register).

A paragraph is determined by the following method. If, for example, one or more spaces corresponding to one or more characters is present at the beginning of a line in each text, the beginning of this line is regarded as the beginning of a paragraph. In addition, if the beginning of the current line is closer to the left margin than the beginning of the preceding line (a character excluding a space) by one character or more, the current line is regarded as a line belonging to the same paragraph to which the preceding line belongs.

The document structure shown in FIG. 5, which is obtained by the above processing, is called a logical structure of the document.

Subsequently, the input device 3 is operated to read out the document shown in FIG. 2, which is processed by the document processing device 1, i.e., the editing document. The readout document is input to the document segmenting device 5. The document segmenting device 5, which is similar to the document segmenting device 4, performs to obtain the logical structure of the editing document. If, however, the contents of the editing document is known and the titles are not hierarchically arranged, the document segmenting device 5 may simply segment the editing document in units of titles to obtain the titles as a logical structure.

The input device 3 is operated to operate the link relation control device 7. The link relation control device 7 reads the logical structure information of the source document obtained by the document segmenting device 4 and the logical structure information of the editing document obtained by the document segmenting device 5. The link relation control device 7 creates a link relation control table of the logical structures of the two documents on the basis of these pieces of information. The link relation control device 7 then generates a signal for displaying the created link relation control table, and the display device 6 displays the link relation control table.

FIG. 6 shows a link relation control table 60 displayed on the display device 6. This link relation control table 60 is arranged in the form of a two-dimensional coordinate system. More specifically, the logical structure of the source document, i.e., start character strings belonging to the list of headings information 31, is displayed in a column 61, whereas the logical structure of the editing document, i.e., the start character strings belonging to the title information 11 and the subtitle information 12, is displayed in a row 62. In this case, in order to prevent the display screen from being enlarged, the numbers of characters to be displayed in the column 61 and the row 62 of the link relation control table 60 are limited. Instead, the character strings can be scrolled in the column 61 and row 62 and the table 60 can be scrolled in the display screen. Display windows 63 and 64 are arranged on the upper portion of the link relation control table 60 to display pieces of information indicating a specific element of the source document and a specific portion of the editing document. These documents are to be linked with each other. The pieces of information displayed in the display windows 63 and 64 change in accordance with the display position of a cursor 68 on the screen. If, for example, the cursor 68 is displayed at the position in FIG. 6, the character string "2. Discussion of Problem" in the source document is displayed in the display window 63, and the character string "2. Description of the Related Art" in the editing document is displayed in the display window 64. If, therefore, linking designation (e.g., clicking) is performed in this state, linking of the text of "2. Discussion of Problem" in the source document with "2. Description of the Related Art" in the editing document is designated.

A check-mark 67 in the link relation control table 60 indicates that designation of linking of the corresponding portion of the source document with the corresponding portion of the editing document through the process to be described later is determined. Note that even if designation is determined, the determination can be canceled by performing a clicking operation with the cursor 68 being set at the corresponding position, and a combination of a portion of the source document and a portion of the editing document can be determined again. A mark "X" 69 in the link relation control table 60 indicates that the source document includes no text to be linked. Therefore, an useless designation can be prevented.

An OK key 65 to be operated by the input device 3 is placed on the upper portion of the screen. The OK key 65 is used to operate the document linking processor 8 to be described later. More specifically, when the OK key 65 is operated while all combinations of portions of the source document and portions of the editing document are determined as described above, the document linking processor 8 is operated to perform a linking process for the combinations with the check-marks 67, i.e., simultaneously link the designated texts in the source document with the designated portions in the editing document.

Black bars 70 and 71 in FIG. 6 indicate scroll bars to be operated by the input device 3. These black bars 70 and 71 indicate an area which is actually displayed on the screen. Reference numeral 72 denotes a mark for indicating the presence of plural paragraphs.

FIG. 7 is a flow chart showing a sequence of operations in the link relation control device 7, more specifically a sequence of operations to be performed after a clicking operation is performed while the cursor 68 is positioned to the square 66.

At step 71, in response to the clicking operation, the element of the source document and the element of the editing document which are designated on the screen in FIG. 6 are respectively set in registers A and B.

At step 72, it is determined, on the basis of the segmentation result obtained by the document segmenting device 4, whether the text in the register A includes a plural number of elements (paragraphs or sentences). If YES at step 72, a screen like the one shown in FIG. 8 is displayed at step 73 to allow the user to select paragraphs or sentences. That is, if the source document includes two or more paragraphs or sentences as contents, a screen for designating specific paragraphs or sentences appears, as shown in FIG. 8. In this case, if there are many paragraphs or sentences, a scroll bar 84 is displayed.

Referring to FIG. 8, linking of "2. Discussion of Problem" with "2. Description of the Related Art" is designated. In this case, the start character string of each element (each paragraph in this case) of "2. Discussion of Problem" appears on the screen through a toggle area 81. When paragraphs to be linked is to be selected from these paragraphs, the toggle area 81 in which the contents of the target paragraphs are displayed is designated with the input device 3. As a result, the color of the character string of the toggle area 81 is inverted (marked). When an OK key 83 is checked in this state, the inverted elements are selected as elements to be linked.

If it is determined at step 72 that the text in the register A includes a signal element (a paragraph or sentence), the text relating to the register A is determined as a target element to be linked at step 74.

After steps 73 and 74, it is determined at step 75 whether a check-mark is displayed at the portion corresponding to the target element. If NO at step 75, the check-mark is displayed at step 76. If YES at step 75, the display of the check-mark is turned off at step 77. Since the display of the check-mark is turned on/off in accordance with the determination at step 75, the selection of the target element can be canceled. Thereafter, it is determined at step 78 whether the OK key 65 (FIG. 6) is clicked. If NO at step 78, the flow returns to step 71 to select the next target element or cancel the selection of a selected target element. If YES at step 78, a linking process is performed at step 79. At step 79, on the basis of the link relation information designated through the link relation control device 7, the document linking processor 8 links the contents of the source document with the editing document which is currently edited by the document processing device 1. The document linking processor 8 then outputs the processed document to the display device 6.

FIG. 9 shows the result obtained by linking the document with the document in FIG. 2 in accordance with the link relation shown on the screen in FIG. 6.

According to the above embodiment, the link relation control table 60 indicating the relation between the logical structure of the source document and the logical structure of the editing document as shown in FIG. 6 is created. When a specific portion of the source document and a specific portion of the editing document which are to be linked with each other are designated, these portions are displayed on the link relation control table as a link pair. Therefore, it is possible to confirm all link pairs on the table at once. If it is necessary to correct the link relation, it is sufficient to perform the link relation control procedure again. When the linking processor is operated, all links are done simultaneously. Therefore, it is possible to prevent an editing error and improve the editing procedure.

The above embodiment includes the two document segmenting devices. However, one document segmenting device may be used for the above purposes.

Other examples of the link relation control table will be described.

In the above embodiment, only one document is linked with the editing document. However, it is possible to link plural documents with the editing document. Though only one check-mark 67 is displayed in each cell (linking designation) of the table, it is possible to display plural check-marks in each cell of the table, as shown in FIG. 10. In this case, the priority of plural source document portions is in order from the top. For example, "1.1 Background", "1.2 Purpose", and "2. Discussion of Problem" are linked with "Field of the Invention" in this order.

FIG. 11 shows a modification of the table shown in FIG. 11 in which the priority of the plural source document portions can be designated. In this case, "1.1 Background", "2. Discussion of Problem", and "1.2 Purpose" are linked with "Field of the Invention" in this order.

In the above description, the link relation control table is created by using the headings of the documents. However, it is possible to create the table by using the character string of the beginning of the paragraph or sentence if the document is short.

FIG. 12 shows the link relation control table in which the logical structure of the source document is expressed by the character string of the beginning of the paragraph or sentence. By using this table, the efficiency of the editing procedure can be improved since the logical structure at the sentence level can be recognized.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, it is possible to link plural source documents with the editing document. It is possible to link an editing document with another editing document and link a source document with a stored document. The link control table is not limited to the two-dimensional manner but can be modified by laterally arranging both the portions of the source document and the portions of the editing document in a column, i.e., in a one-dimensional manner. In this case, the link relation may be displayed in the form of an arrow starting from the portions of the source document and ending at the portions of the editing document. The number of layers of the logical structure of the document is not limited to two. If the logical structures of the source document and the editing document have different number of layers, the table can be created by using any layer of headings.

What is claimed is:

1. A document editing apparatus for linking at least a portion of a source document with an editing document, comprising:

source document segmenting means for segmenting said the source document into portions in accordance with a document structure;

editing document segmenting means for segmenting editing document into portions in accordance with a document structure;

table display means for creating and displaying a table indicating a logical structure of the source document which is composed of the portions of the source document obtained by said source document segmenting means and a logical structure of the editing document which is composed of the portions of the editing document obtained by said editing document segmenting means;

linking designation means for designating linking combination portions according to the table displayed by said display means, designated linking portions being marked on the table; and linking process means for performing a linking process for the designated linking combination portions to link designated portions in the source document with designated portions in the editing document.

2. An apparatus according to claim 1, in which said source document segmenting means segments the source document into portions in accordance with a list of headings information of the source document and said editing document segmenting means segments the editing document into portions in accordance with a list of headings information of the editing document.

3. An apparatus according to claim 2, in which said list of headings information comprises hierarchical headings, said source document segmenting means segments the source document into portions, and said editing document segmenting means segments the editing document into hierarchical portions.

4. An apparatus according to claim 3, in which said display means displays a table in which character strings to distinguish the portions in a first predetermined level of the source document are arranged in one of a row and a column direction and character strings to distinguish the portions in a second predetermined level of the editing document are arranged in the other of the row and the column direction and said designating means displays a mark at a cross point of the row and the column corresponding to the linking combination portion.

5. An apparatus according to claim 4, in which said display means comprises means for changing the level of the source document and the level of which character strings to distinguish are displayed in the table.

6. An apparatus according to claim 1, in which said display means displays a table in which character strings to distinguish the portions of the source document are arranged in one of a row and a column direction and character strings to distinguish the portions of the editing document are arranged in the other of the row and the column direction and said designating means displays a mark at a cross point of the row and the column corresponding to the linking combination portion.

7. An apparatus according to claim 1, in which said display means displays a table in which headings of the portions of the source document are arranged in one of a row and a column direction and headings of the portions of the editing document are arranged in the other of the row and the column direction and said designating means displays a mark at a cross point of the row and the column corresponding to the linking combination portion.

8. An apparatus according to claim 1, in which said display means comprises means for scrolling displayed characters in the table.

9. An apparatus according to claim 1, in which said linking designation means comprises means for designating plural portions of said source document having a predetermined priority to be linked with the same portion of the editing document.

10. An apparatus according to claim 1, in which said linking designation means comprises means for designating plural portions of said source document having a desired priority to be linked with the same portion of the editing document.

11. An apparatus according to claim 1, further comprising a personal computer for creating the source document and the editing document.

12. An apparatus according to claim 1, further comprising a word processor for creating the source document and the editing document.

13. An apparatus according to claim 1, further comprising means for storing the source document and the editing document.

14. An apparatus according to claim 1, in which said display means displays a table indicating a logical structure of plural source documents and a logical structure of plural editing documents and said linking process means performs a linking process for the designated linking combination portions to simultaneously link designated portions in the source documents with designated portions in the editing documents.

15. An apparatus according to claim 1, in which said linking designation means comprises means for canceling designation of the linking combination portions.

* * * * *